April 4, 1950     W. E. WANNER     2,503,228
DISPERSING DEVICE
Filed Dec. 24, 1946
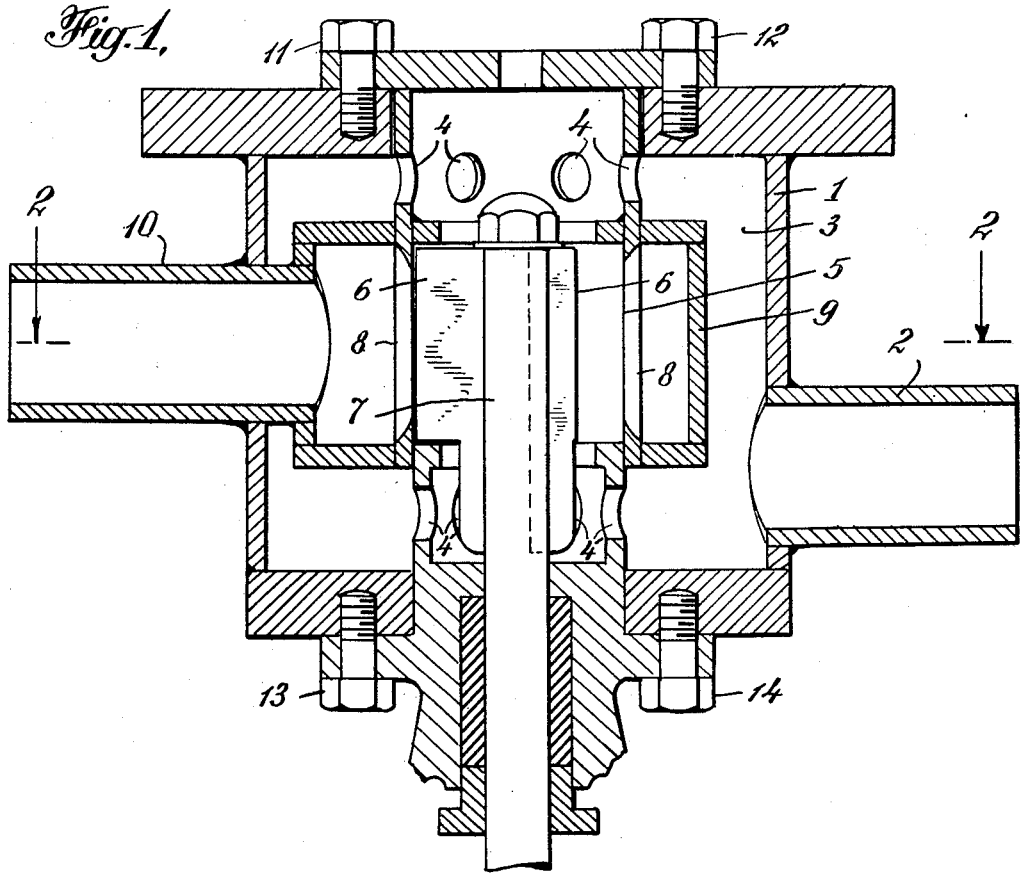
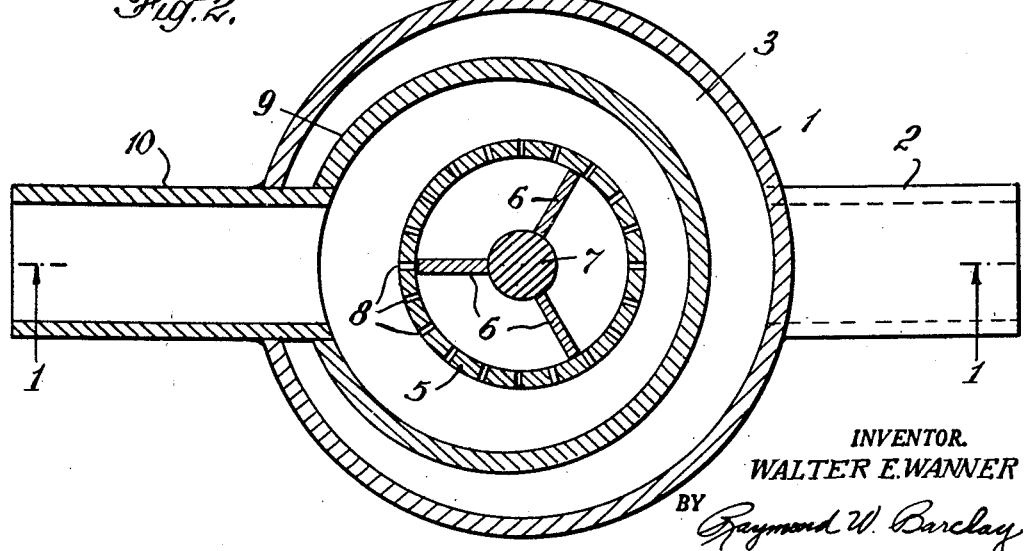
INVENTOR.
WALTER E. WANNER
BY Raymond W. Barclay
AGENT OR ATTORNEY Patented Apr. 4, 1950

2,503,228

UNITED STATES PATENT OFFICE 2,503,228

DISPERSING DEVICE

Walter E. Wanner, Olean, N. Y., assignor to Socony-Vacuum Oil Company, Incorporated, New York, N. Y., a corporation of New York Application December 24, 1946, Serial No. 718,157

2 Claims. (Cl. 259—7)

This invention relates to an improved apparatus for the preparation of emulsions and other disperse systems. More particularly, the present invention is directed to that type of apparatus known in the art as a colloid mill, useful in the formation and stabilization of emulsions or suspensions.

The invention seeks to provide an apparatus of the type indicated having simplicity of form and operation wherein an intimate direct shearing action is effected in the components present in the mixture being supplied to said apparatus.

A further object of the invention is the provision of a colloid mill having an extensive shearing surface available whereby matter to be dispersed is rapidly rotated in admixture with fluid against said shearing surface, thereby producing a dispersion of said matter in said fluid.

The invention further contemplates the provision of a colloid mill having a rotary dispersing member so that in addition to a direct shearing action, an indirect shearing is obtained by rapid circulation of the mass with a high speed revolving rotor having a shaft with a plurality of vanes radially attached thereto.

A still further object of the invention is to provide a colloid mill in which the rotating members and shearing surface can easily and conveniently be removed from the casing or frame of the apparatus for the purpose of repairing or cleaning the same and be reassembled with a minimum of difficulty.

Another object of the present invention is the provision of a compact colloid mill in which the axes of the feed and discharge passages are substantially parallel, thereby permitting the apparatus to be easily installed in an existent system of conduits, storage tanks, and like apparatus.

Other objects and advantages of the invention will be apparent from the following description, reference being made to the drawings attached hereto wherein a preferred embodiment of the present invention is illustrated.

Figure 1 is a cross section taken vertically through the apparatus.

Figure 2 is a plan view of the apparatus in horizontal partial cross section.

Referring now to the drawings and particularly to Figure 1, I denotes the housing chamber of the apparatus which is substantially circular, although it will be understood that any other shape or form of housing may be employed with equal success in the practice of this invention. The housing chamber is provided with an inlet passage 2 through which the feed mixture is introduced. Said mixture passes through channel 3 and flows through a number of circular openings 4, leading to dispersing chamber 5. There, the mixture comes in contact with a plurality of rotor vanes 6 mounted on a vertically positioned shaft 7 which is rapidly revolved by a source of power not shown. The vanes as indicated extend radially from said central shaft almost to the circumference of the dispersing chamber and extend vertically along said shaft so that the vane length is only slightly less than the depth of said chamber. A slight clearance is thus left between the vanes and the surrounding portions of the dispersing chamber. The circular circumference of said chamber is pierced by a plurality of extremely narrow longitudinal slits 8, which extend substantially the entire depth of said chamber and consequently are of substantially the same length vertically as the rotor blades. These numerous, narrow longitudinal slits, more or less equidistantly positioned along the circumference of the dispersing chamber, provide an excellent shearing surface for finely dispersing the matter forced against them by the revolving rotor blades. Surrounding the dispersing chamber is an annular chamber 9, provided with discharge passage 10 through which the dispersed or emulsified product is removed by centrifugal action of the high speed revolving rotor vanes.

In a preferred embodiment of the invention shown in Figure 1 it will be noted that the axes of feed inlet 2 and discharge outlet 10 are substantially parallel so that the colloid mill may easily and conveniently be installed in an existent system of apparatus with a minimum of difficulty. Also, the apparatus of this invention can easily be dismantled for repairs or cleaning by simply loosening bolts 11 and 12 and vertically withdrawing the dispersing chamber and its supporting upper structure from the housing of the apparatus. In a similar manner, the rotor may be easily removed from the housing of the apparatus by simply loosening bolts 13 and 14, which allows the rotor and its supporting structure to be withdrawn.

Referring now to Figure 2 showing the apparatus in horizontal section, it will be seen that three rotor vanes 6 are mounted on shaft 7. While this number of vanes serves effectively to rotate and partially disperse the mass under treatment, it will be understood that the apparatus of this invention likewise contemplates the use of a rotor having a smaller or larger number of vanes. Also, it will be realized that the number and width of narrow longitudinal slits 8 in the surface of dispersing chamber 5 may be varied, depending on the speed of rotation of the rotor vanes, the character of the feed mixture and the degree of dispersion desired in the resulting product. Generally, slits having a width of the order of one-sixteenth of an inch have been found to provide an excellent shearing surface for the dispersion of one liquid in another, yielding a resultant stable emulsion.

In the preparation of some dispersions using the apparatus of this invention, it has been found that a product of improved quality can be obtained by constructing the colloid mill from about five to ten times oversize and so piping the apparatus when it is installed that a portion of the product stream being withdrawn through the discharge passage is bled off and returned to the inlet passage of the apparatus, thus permitting it to pass through the dispersing device several times, yielding a uniformly dispersed high quality product.

While the apparatus of this invention may be employed in the preparation of dispersions of one fluid in another, or of a solid in a fluid, it is particularly adaptable for the preparation of stable emulsions. Thus, a typical example involving use of the described apparatus comprises feeding a crude mixture of an oil, water, and emulsifying agent through inlet 2, through channel 3, inlet ports 4 to dispersing chamber 5, where the mixture comes into contact with three revolving rotor vanes 6. In the dispersing chamber, which has a plurality of longitudinal slits about one-sixteenth of an inch wide, substantially equidistantly spaced along the circumference of the dispersing chamber approximately one inch apart, an intimate direct shearing of oil globules in the aqueous mixture takes place to give a resulting stable emulsion of oil-in-water which is discharged through outlet 10 by the centrifugal force of the rapidly revolving rotor vanes.

The apparatus herein described is of simple construction and design, providing, in addition to an indirect shearing action by rapid circulation of the mass under treatment, a direct intimate shearing of the material in the feed mixture to a finely dispersed degree to yield a resultant stable emulsion or dispersion. Due to the high available shearing surface, moreover, the component in the feed mixture to be disintegrated is rapidly dispersed and the resulting product expelled by centrifugal action.

I claim:

1. A dispersing device comprising a wall defining a cylindrical chamber having an inlet section wherein the wall of said chamber is pierced by inlet ports and a dispersing section adjacent thereto wherein said wall is pierced by a plurality of longitudinal slits, the unpierced area of the wall about said dispersing section being substantially greater than the total area of said slits, a rotor in said dispersing section having a shaft co-axial with said chamber and a plurality of radial vanes fixed to said shaft of about the same length as said slits and projecting to points adjacent to said pierced wall of said dispersing section, walls defining an annular chamber about said dispersing section and communicating therewith through said slits, walls defining a feed chamber about said cylindrical chamber and said annular chamber communicating with said inlet section through said inlet ports, means to supply fluid to said feed chamber and means to discharge fluid from said annular chamber.

2. A dispersing device comprising a wall defining a cylindrical chamber having an inlet section wherein the wall of said chamber is pierced by inlet ports and a dispersing section adjacent thereto wherein said wall is pierced by a plurality of longitudinal slits, the unpierced area of the wall about said dispersing section being substantially greater than the total area of said slits, a rotor in said dispersing section having a shaft co-axial with said chamber and a plurality of radial vanes fixed to said shaft of about the same length as said slits and projecting to points adjacent to said pierced wall of said dispersing section, walls defining an annular chamber about said dispersing section and communicating therewith through said slits, walls defining a feed chamber about said cylindrical chamber and said annular chamber communicating with said inlet section through said inlet ports, a conduit to supply fluid to said feed chamber and a conduit to discharge fluid from said annular chamber, the horizontal axes of said conduits being substantially parallel.

WALTER E. WANNER.

REFERENCES CITED

The following references are of record in the file of this patent:

UNITED STATES PATENTS

| Number | Name | Date |
|---|---|---|
| 1,763,379 | Thurm et al. | June 10, 1930 |
| 1,794,214 | Thurm et al. | Feb. 24, 1931 |
| 2,169,339 | Ditto | Aug. 15, 1939 |

FOREIGN PATENTS

| Number | Country | Date |
|---|---|---|
| 631,993 | France | Dec. 29, 1927 |